United States Patent [19]

Meyer

[11] Patent Number: 4,826,581
[45] Date of Patent: May 2, 1989

[54] CONTROLLED PROCESS FOR THE PRODUCTION OF THERMAL ENERGY FROM GASES AND APPARATUS USEFUL THEREFORE

[76] Inventor: Stanley A. Meyer, 3792 Broadway, Grove City, Ohio 43123

[21] Appl. No.: 81,859

[22] Filed: Aug. 5, 1987

Related U.S. Application Data

[63] Continuation-in-part of Ser. No. 835,564, Mar. 3, 1986, abandoned.

[51] Int. Cl.$^4$ .............................................. C07G 13/00
[52] U.S. Cl. ................................. 204/157.41; 204/164
[58] Field of Search ............... 204/164, 157.41, 157.44

[56] References Cited

U.S. PATENT DOCUMENTS

| | | | |
|---|---|---|---|
| 4,233,109 | 11/1980 | Nishizawa | 204/164 X |
| 4,406,765 | 9/1983 | Higashi et al. | 204/164 |
| 4,687,753 | 8/1987 | Fiato et al. | 204/157.41 X |
| 4,695,357 | 9/1987 | Boussert | 204/157.41 |

Primary Examiner—Stephen J. Kalafut
Attorney, Agent, or Firm—Porter, Wright, Morris & Arthur

[57] ABSTRACT

A method of and apparatus for obtaining the release of energy from a gas mixture including hydrogen and oxygen in which charged ions are stimulated to an activated state, and then passed through a resonant cavity, where successively increasing energy levels are achieved, and finally passed to an outlet orifice to produce thermal explosive energy.

2 Claims, 7 Drawing Sheets

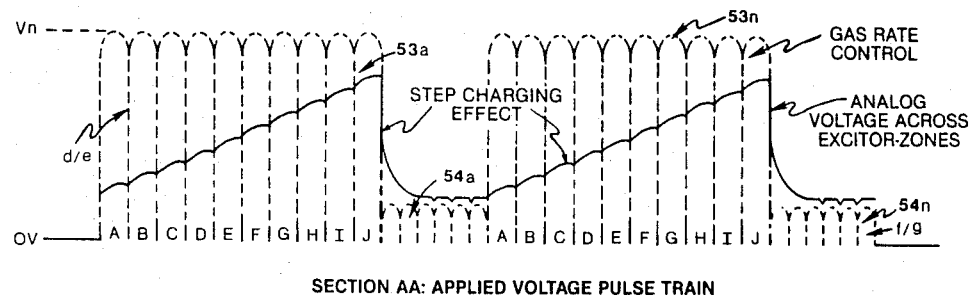
SECTION AA: APPLIED VOLTAGE PULSE TRAIN
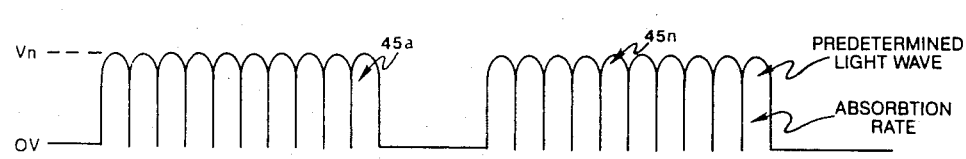
SECTION BB: APPLIED LASER OR PHOTON PULSE TRAIN
FIG. 5
FIG. 6
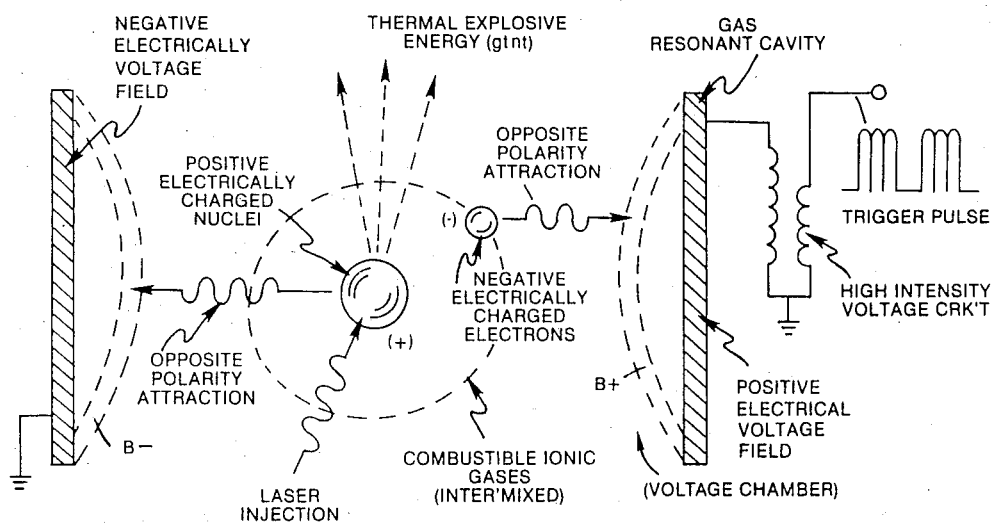

4,826,581

CONTROLLED PROCESS FOR THE PRODUCTION OF THERMAL ENERGY FROM GASES AND APPARATUS USEFUL THEREFORE

RELATED APPLICATION

This is a continuation-in-part of my co-pending application Ser. No. 835,564, now abandoned.

FIELD OF THE INVENTION

This invention relates to a method of and apparatus for obtaining the release of energy from a gas mixture including hydrogen and oxygen in which charged ions are stimulated to an actived state, and then passed through a resonant cavity, where successively increasing energy levels are achieved, and finally passed to an outlet orifice to produce thermal explosive energy.

BACKGROUND OF THE PRIOR ART

Processes have been proposed for many years in which controlled energy producing reactions of atomic particles are expected to occur under "cold" conditions. [See. e.q.. Rafelski, J. and Jones, S.E., "Cold Nuclear Fusion," *Scientific American,* July, 1987, page 84]. The process and apparatus described herein are considered variations to and improvements in processes by which energy is derived from excited atomic components in a controllable manner.

OBJECTS OF THE INVENTION

It is an object of the invention to realize significant energy-yield from water atoms. Molecules of water are broken down into hydrogen and oxygen gases. Electrically charged gas ions of opposite electrical polarity are activated By Express Mail No. 26224690 on August 5, 1987 by electromagnetic wave energy and exposed to a high temperature thermal zone. Significant amounts of thermal energy with explosive force beyond the gas burning stage are released.

An explosive thermal energy under a controlled state is produced. The process and apparatus provide a heat energy source useful for power generation, aircraft, rocket engines, or space stations.

BRIEF DESCRIPTION OF THE DRAWINGS

FIGS. 5A and 5B, respectively, show (A) an electron extractor grid used in the injector assemblies of FIG. 2A and FIG. 2B, and (B) the electronic control circuit for the extractor grid.

DESCRIPTION OF THE PREFERRED EMBODIMENT

Figure 1:
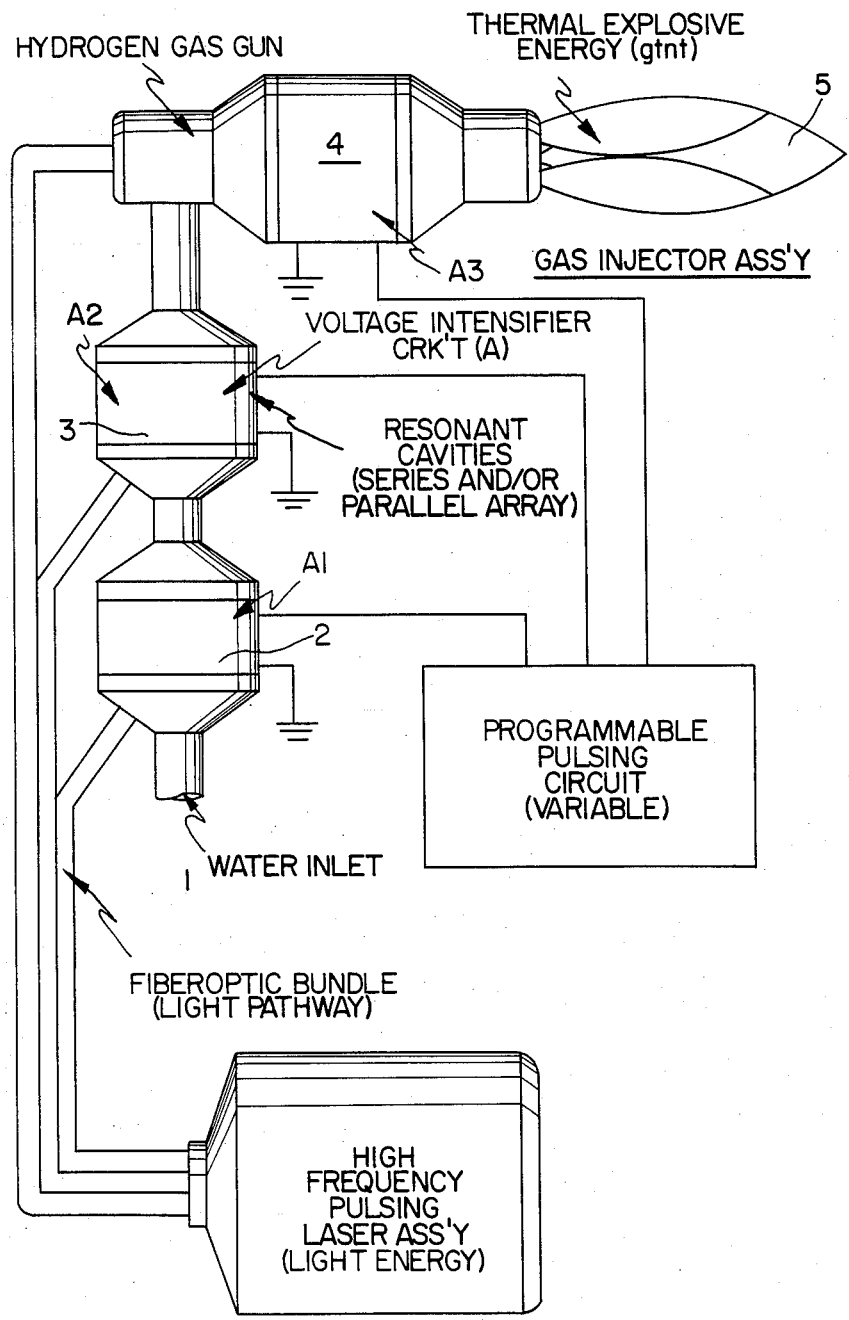
FIG. 1 illustrates a staged arrangement of apparatus useful in the process, beginning with a water inlet and culminating in the production of thermal explosive energy.

The hydrogen fracturing process, follows the sequence of steps shown in the following Table I in which beginning with water molecules, the molecule is subjected to successively increasing electrical, wave energy and thermal forces. In the succession of forces, radomly oriented water molecules are aligned with respect to molecular polar orientation and are themselves polarized and "elongated" by the application of an electric potential to the extent that covalent bonding of the water molecule is so weakened that the atoms disassociate and the molecule breaks down into hydrogen and oxygen elemental components. The released atomic gases are next ionized and electrically charged in a vessel while being subjected to a further energy source that promotes inter-particle impact in the gas at an increased overall energy level. Finally, the atomic particles in the excited gas, having achieved successively higher energy levels, are subjected to a laser or electromagnetic wave energy source that produces atomic destabilization and the final release of thermal explosive energy. Engineering design parameters based on known theoretical principles of atomic physics determine the incremental levels of electrical and wave energy input required to produce resonance in each stage of the system. Instead of a dampening effect, a resonant energization of the molecule, atom or ion provides a compounding energy interaction resulting in the final energy release.

TABLE I

| PROCESS STEPS LEADING TO IGNITION | |
|---|---|
| RELATIVE STATE OF WATER MOLECULE AND/OR HYDROGEN/OXYGEN/OTHER ATOMS | |
| RANDOM | 1st Stage |
| ALIGNMENT | Water to Gas |
| POLARIZATION | 2nd Stage |
| MOLECULAR ELONGATION | Gas Ionization |
| ATOM LIBERATION | 3rd Stage |
| LIQUID TO GAS IONIZATION | Priming |
| ELECTRICAL CHARGING EFFECT | Final Stage |
| PARTICLE IMPACT | Ignition |
| ELECTROMAGNETIC WAVE, LASER OR PHOTON INJECTION | |
| ELECTRON EXTRACTION | |
| ATOMIC DESTABILIZATION | |
| THERMAL IGNITION | |

After the first stage in which water is broken down into its atomic components in a mixture of hydrogen, oxygen and formerly dissolved entrapped gasses, the gas atoms become elongated during electron removal as the atoms are ionized. Laser, or light wave energy of a predetermined frequency is injected into a containment vessel in a gas ionization process. The light energy absorbed by voltage stimulated gas nuclei causes destabilization of gas ions still further. The absorbed laser energy causes the gas nuclei to increase in energy state, which, in turn, causes electron deflection to a higher orbital shell.

The electrically charged and laser primed combustible gas ions from a gas resonant cavity may be directed into an optical thermal lens assembly for triggering. Before entry into the optimal thermal lens, however, electrons are stripped from the ions and the atom is destabilized. The destabilized gas ions which are electrically and mass unbalanced atoms having highly energized nuclei are pressurized during spark ignition. The unbalanced, destablized atomic components thermally interact; the energized and unstable hydrogen gas nuclei collide with highly energized and unstable oxygen gas nuclei, causing and producing thermal explosive energy beyond the gas burning stage. The ambient air gas components in the initial mixture aid the thermal explosive process under a controlled state.

In the process, the point of optimum energy-yield is reached when the electron deficient oxygen atoms (having less than a normal number of electrons) lock onto and capture a hydrogen atom electron prior to or during thermal combustion of the hydrogen/oxygen mixture. Atomic decay results in the release of energy.

In a general outline of the method, a first gas mixture including at least a portion of hydrogen and oxygen gases is provided. The gas mixture is subjected to a pulsating, polar electric field whereby electrons of the gas atoms are distended in their orbital fields by reason of their subjection to electrical polar forces. The polar pulsating frequency applied is such that the pulsating electric field induces a resonance with respect to an election of the gas atom. A cascade effect results and the energy level of specific resonating electron is increased in cascading, incremental steps.

Next, the gas atoms are ionized and subjected to electro-magnetic wave energy having a predetermined frequency to induce a further election resonance in the ion, whereby the energy level of the election is successively increased. Electrons are extracted from the resonating ions while such ions are in an increased energy state to destabilize the nuclear electron configuration of said ions; and the gas mixture of destabilized ions is thermally ignited.

In the apparatus shown in FIG. 1, water is introduced at inlet 1 into a first stage water fracturing module 2 in which water molecules are broken down into hydrogen, oxygen and released entrapped gas components by an electrical disassociation process and apparatus such as shown in my co-pending application Ser. No. 835,564, filed March 3, 1986, which is incorporated herein by reference. The released atomic gases and other gas components formerly entrapped as dissolved gases in water may be introduced to a successive stage 3 or other number of like resonant cavities, which are arranged in either a series or parallel combined array. The successive energization of the gas atoms provides a cascading effect, successively increasing the voltage stimulation level of the released gasses as they sequentially pass through cavities 2, 3, etc. In a final stage, an injector system 4, of a configuration of the type shown in FIGS. 2A or 2B, receives energized atomic and gas particles where the particles are subjected to further energy input, electrical excitation and thermal stimulation, whereby thermal explosive energy results 5, which may be directed thru a lens assembly of the type shown in FIG. 2C to provide a controlled thermal energy output.

Electromagnetic wave activated and electrically charged gas ions of hydrogen and oxygen (of opposite polarity) are expelled from the cascaded cells 2, 3, etc. The effect of cascading successively increases the voltage stimulation level of the released gases, which then are directed to the final injector assembly 4. In the injector assembly, gas ions are stimulated to a yet higher energy level. The gases are continually exposed to a pulsating laser or other electromagnetic wave energy source together with a high intensity oscillating voltage field that occurs within the cell between electrodes or conductive plates of opposite electrical polarity. A preferred construction material for the plates is a stainless steel T-304 which is non-chemically reactive with water, hydrogen, or oxygen. An electrically conductive material which is inert in the fluid environment is a desirable material of construction for the electrical field producing plates, through which field the gas stream of activated particles passes. Gas ions of opposite electrical charges reach and maintain a critical energy level state. The gas ions are oppositely electrically charged and subjected to oscillating voltage fields of opposite polarity and are also subjected to a pulsating electromagnetic wave energy source. Immediately after reaching critical energy, the excited gas ions are exposed to a high temperature thermal zone in the injection cell, 4, that causes the excited gas ions to undergo gas combustion. The gas ignition triggers atomic decay and releases thermal energy, 5, with explosive force.

Once triggered, the thermal explosive energy output is controllable by the attenuation of operational parameters. With reference to FIG. 4A, for example, once the frequency of resonance is identified, by varying applied pulse voltage to the initial water fuel cell assemblies, 2, 3, the ultimate explosive energy output is likewise varied. By varying the pulse shape and/or amplitude or pulse train sequence of the electromagnetic wave energy source, final output is varied. Attenuation of the voltage field frequency in the form of *OFF* and *ON* pulses likewise affects output of the staged apparatus. Each control mechanism can be used separately, grouped in sections, or systematically arranged in a sequential manner.

Figure 3:
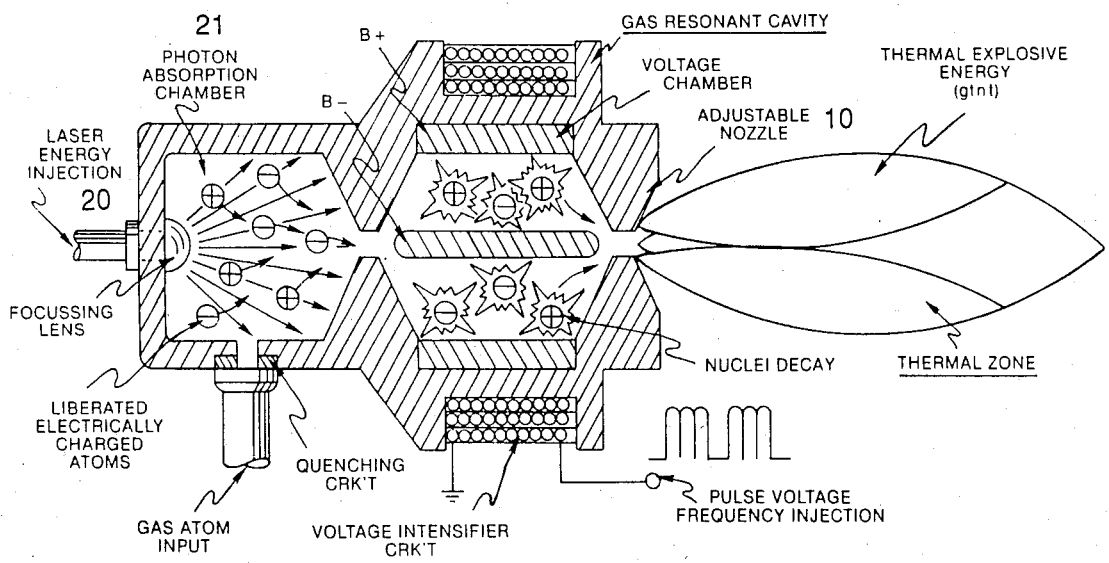
FIGS. 3A, 3B, 3C and 3D are illustrations depicting various theoretical bases for atomic phenomena expected to occur during operation of the invention herein.
Figure 4:
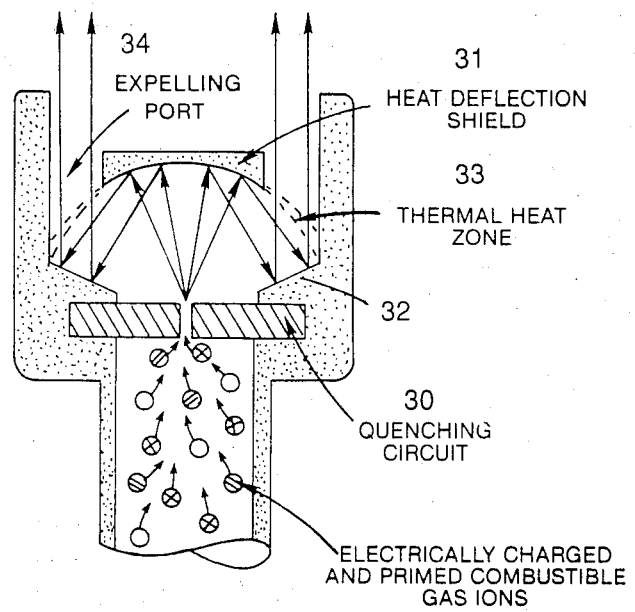
FIG. 4 is an electrical schematic of the voltage source for the gas resonant cavity.
Figure 7:
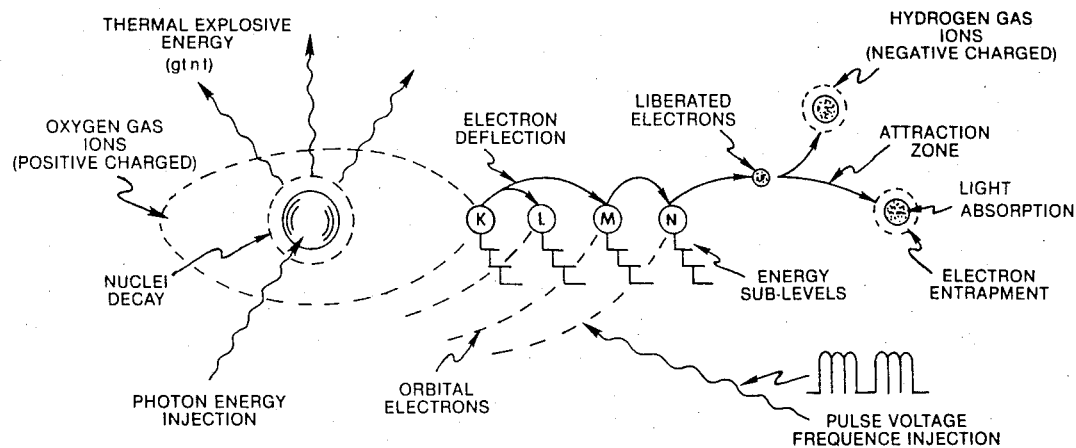
Figure 8:
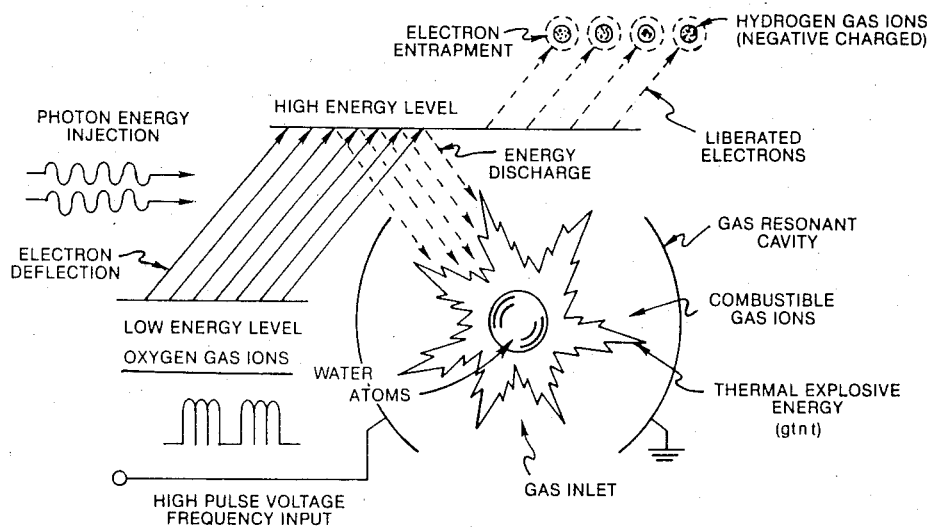
Figure 9:
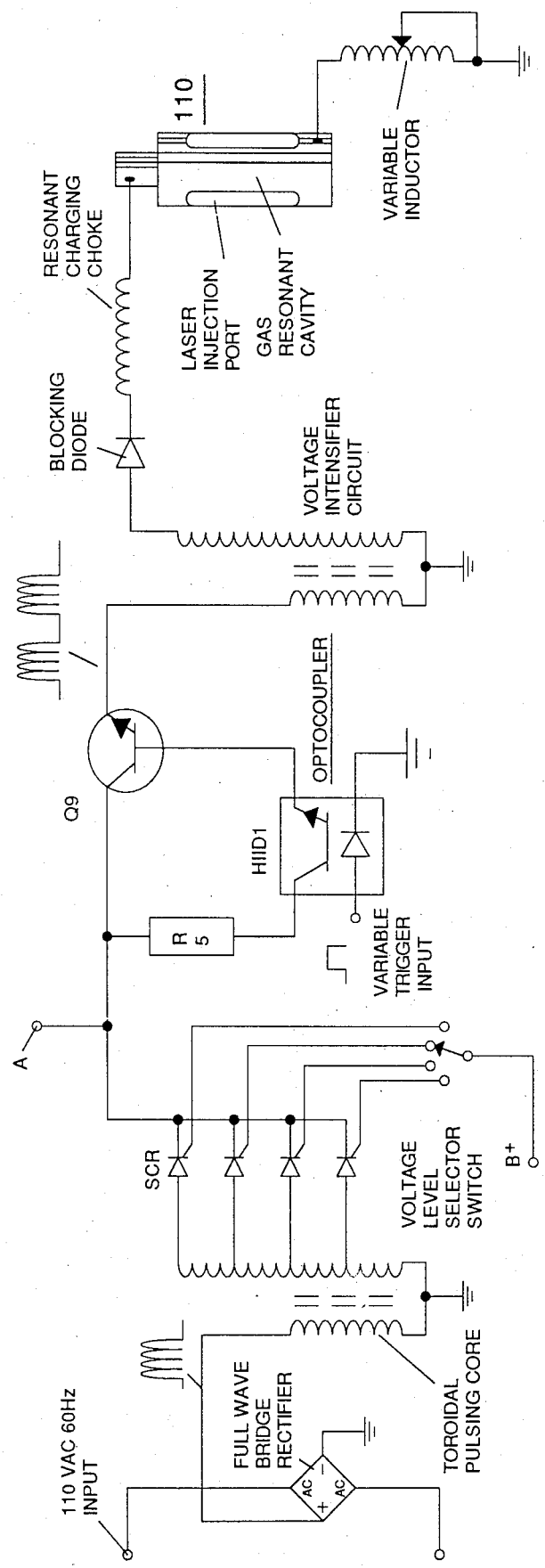
Figure 10:
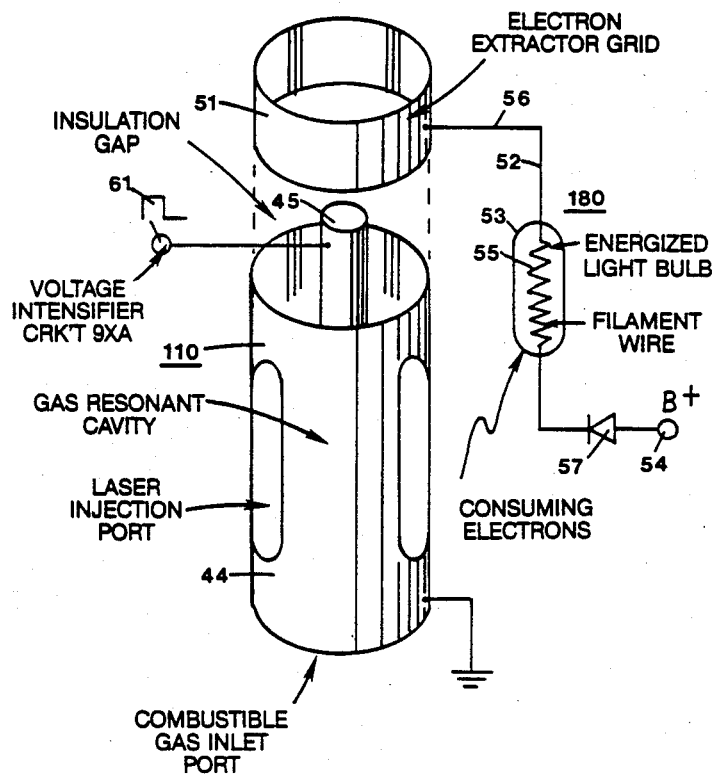
Figure 11:
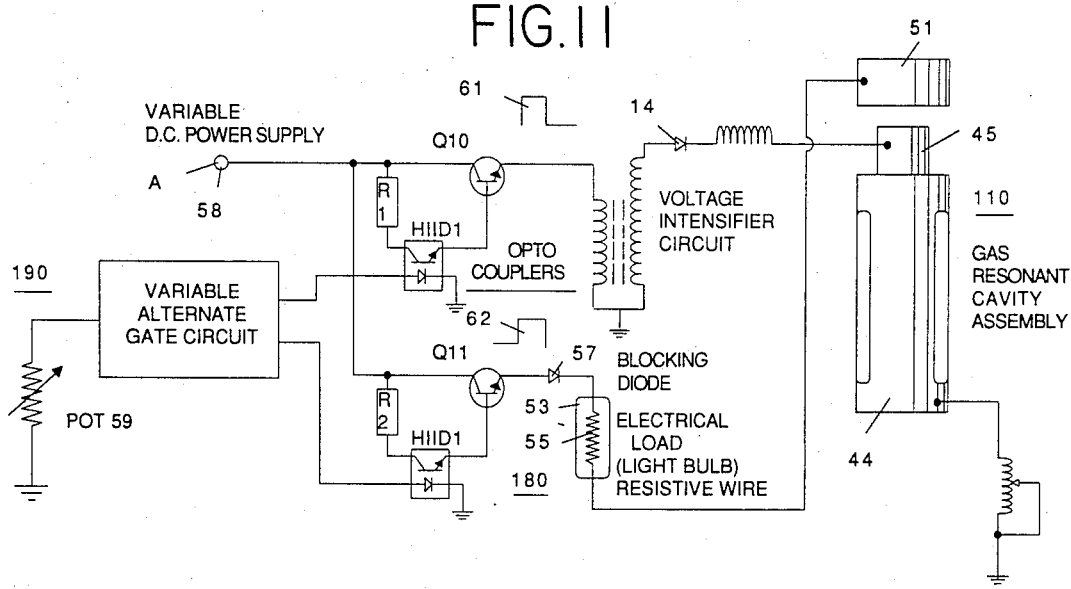

The overall apparatus thus includes means for providing a first gas mixture consisting of at least a portion of hydrogen and oxygen gas. The gases may be obtained by disassociation of the water molecule. An electrical circuit of the type shown in FIG. 4 provides a pulsating, polar electric field to the gas mixture as illustrated in FIG. 3A, whereby electrons of the gas atoms are distended in their orbital fields by reason of their subjection to electrical polar forces, changing from the state conceptually illustrated by FIG. 3B to that of FIG. 3C, at a frequency such that the pulsating electric field induces a resonance with respect to electrons of the gas atoms. The energy level of the resonant electrons is thereby increased in cascading, incremental steps. A further electric field to ionize said gas atoms is applied and an electromagnetic wave energy source for subjecting the ionized gas atoms to wave energy of a predetermined frequency to induce a further electron resonance in the ion, whereby the energy level of the election is successively increased is an additional element of the apparatus as shown in FIG. 3D.

An electron sink, which may be in the form of the grid element shown in FIG. 5A, extracts further electrons from the resonating ions while such ions are in an increased energy state and destabilizes the nuclear electron configuration of the ions. The "extraction" of electrons by the sink means is coordinated with the pulsating electrical field of the resonant cavity produced by the circuit of FIG. 4, by means of an interconnected synchronization circuit, such as shown in FIG. 5B. A nozzle, 10 in FIG. 2B, or thermal lens assembly, FIG. 2C, provides the directing means in which the destabilized ions are finally thermally ignited.

As previously noted, to reach and trigger the ultimate atomic decay of the fuel cell gases at the final stage, sequential steps are taken. First, water molecules are split into component atomic elements (hydrogen and oxygen gases) by a voltage stimulation process called the electrical polarization process which also releases dissolved gases entrapped in the water (See my copending application for letters patent, Ser. No. 835,564, supra). In the injector assembly, a laser produced light wave or other form of coherent electromagnetic wave energy capable of stimulating a resonance within the atomic components is absorbed by the mixture of gases (hydrogen/oxygen/ambient air gases) released by the polarization process. At this point, as shown in FIG. 3B, the individual atoms are subjected to an electric field to begin an ionization process.

The laser or electromagnetic wave energy is absorbed and causes gas atoms to lose electrons and form positively charged gas ions. The energized hydrogen atoms which, as ionized, are positively charged, now accept electrons liberated from the heavier gases and attract other negatively charged gas ions as conceptually illustrated in FIG. 3C. Positively and negatively charged gas ions are re-exposed to further pulsating energy sources to maintain random distribution of ionized atomic gas particles.

Figure 2:
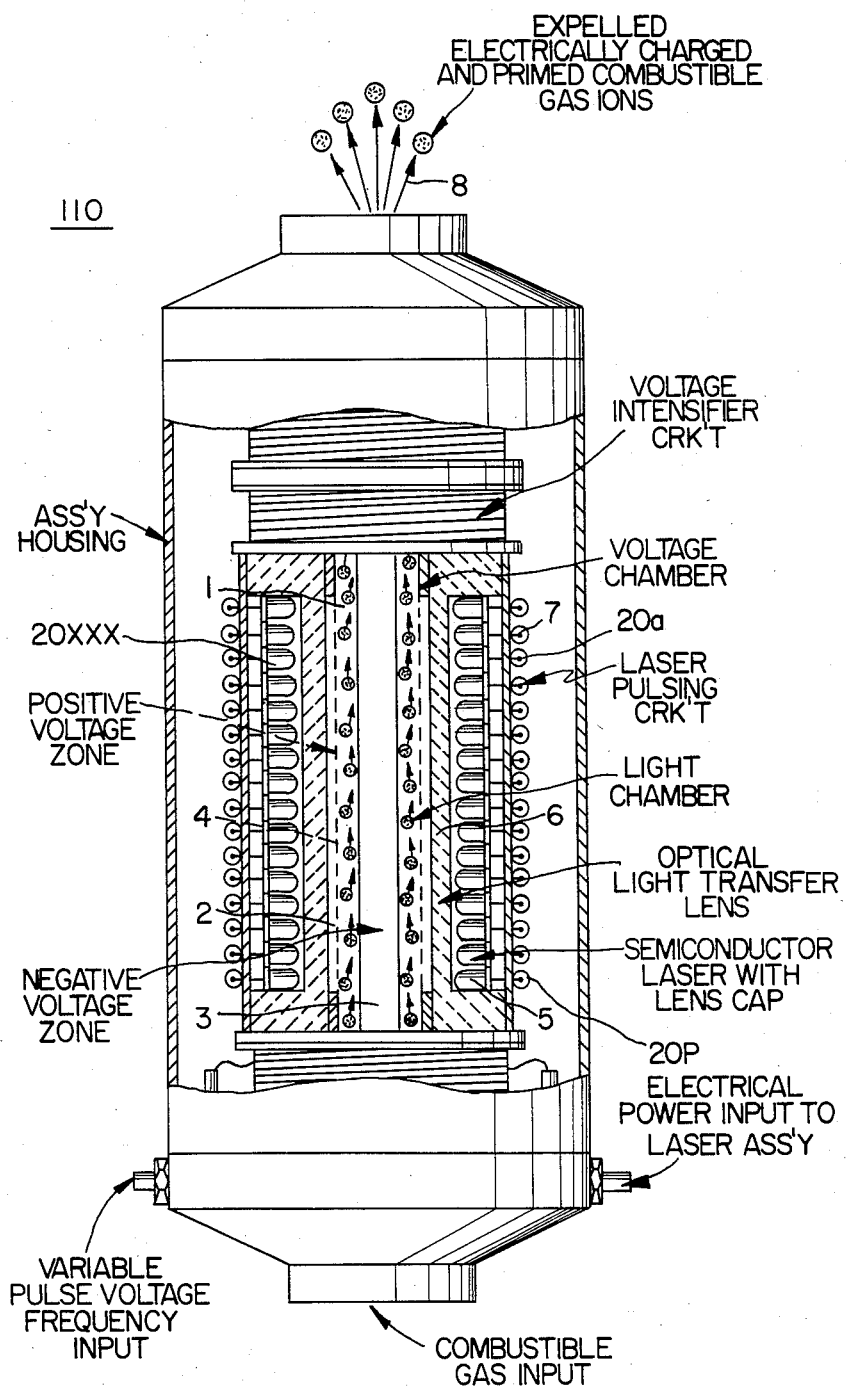
FIG. 2A shows a cross-section of a circular gas resonant cavity used in the final stage assembly of FIG. 1.
FIG. 2B shows an alternative final stage injection system useful in the apparatus of FIG. 1.
FIG. 2C shows an optical thermal lens assembly for use either final stage of FIG. 2A or FIG. 2B.

The gas ions within the wave energy chamber are subjected to an oscillating high intensity voltage field in a chamber 11 in FIGS. 2A and 2B formed within electrodes 12 and 13 in FIGS. 2A and 2B of opposite electrical polarity to produce a resonant cavity. The gas ions reach a critical energy state at a resonant state.

At this point, within the chamber, additional electrons are attracted to said positive electrode; whereas, positively charged ions or atomic nuclei are attracted to the negative electrode. The positive and negative attraction forces are co-ordinate and operate on said gas ions simultaneously; the attraction forces are non-reversible. The gas ions experience atomic component deflection approaching the point of electron separation. At this point electrons are extracted from the chamber by a grid system such as shown in FIG. 5A. The extracted electrons are consumed and prevented from re-entering the chamber by a circut such as shown in FIG. 5B. The elongated gas ions are subjected to a thermal heat zone to cause gas ignition, releasing thermal energy with explosive force. During ionic gas combustion, highly energized and stimulated atoms and atom nuclei collide and explode during thermal excitation. The hydrogen fracturing process occurring sustains and maintains a thermal zone, at a temperature in excess of normal hydrogen/oxygen combustion temperature, to wit, in excess of 2500° F. To cause and maintain atomic elongation depicted in FIG. 3C before gas ignition, a voltage intensifier circuit such as shown in FIG. 4 is utilized as a current restricting voltage source to provide the excitation voltage applied to the resonant cavity. At the same time the interconnected eletron extractor circuit, FIG. 5B, prevents the reintroduction of electrons back into the system. Depending on calculated design parameters, a predetermined voltage and frequency range may be designed for any particular application or physical configuration of the apparatus.

In the operation of the assembly, the pulse train source for the gas resonant cavity shown at 2 and 3 in FIG. 1 may be derived from a circuit such as shown in FIG. 4. It is necessary in the final electron extraction that the frequency with which electrons are removed from the system by sequenced and synchronized with the pulsing of the gas resonant cavity In the circuit of FIG. 5B, the coordination or synchronization of the circuit with the circuit of FIG. 4 may be achieved by interconnecting point "A" of the gate circuit of FIG. 5B to coordinate point "A" of the pulsing circuit of FIG. 4.

Together the hydrogen injector assembly 4 and the resonant cavity assemblies 2, 3 form a gas injector fuel cell which is compact, light in weight and design variable. For example, the hydrogen injector system is suited for automobiles and jet engines. Industrial applications require larger systems. For rocket engine applications, the hydrogen gas injector system is positioned at the top of each resonant cavity arranged in a parallel cluster array. If resonant cavities are sequentially combined in a parallel/series array, the hydrogen injection assembly is positioned after the exits of said resonant cavities are combined.

From the outline of physical phenomena associated with the process described in Table 1, the theoretical basis of the invention considers the respective states of molecules, gases and ions derived from liquid water. Before voltage stimulation, water molecules are randomly dispersed throughout water within a container. When a unipolar voltage pulse train such as shown in FIG. 3A ($53a$ xxx $53n$) is applied, an increasing voltage potential is induced in the molecules, gases and/or ions in a linear, step-like charging effect. The electrical field of the particles within a chamber including the electrical field plates increases from a low energy state (A) to a high energy state (J) in a step manner following each pulse-train as illustrated in FIG. 3A. The increasing voltage potential is always positive in direct relationship to negative ground potential during each pulse. The voltage polarity on the plates which create the voltage fields remains constant. Positive and negative voltage "zones" are thus formed simultaneously.

In the first stage of the process described in Table 1, because the water molecule naturally exhibits opposite electrical fields in a relatively polar configuration (the two hydrogen atoms are positively electrically charged relative to the negative electrically charged oxgen atom), the voltage pulse causes initially randomly oriented water molecules in the liquid state to spin and orient themselves with reference to positive and negative poles of the voltage fields applied. The positive electrically charged hydrogen atoms of said water molecule are attracted to a negative voltage field; while, at the same time, the negative electrically charged oxygen atoms of the same water molecule an attracted to a positive voltage field. Even a slight potential difference applied to the inert, conductive plates of a containment chamber will initiate polar atomic orientation within the water molecule based on polarity differences.

When the potential difference applied causes the orientated water molecules to align themselves between the conductive plates, pulsing causes the voltage field intensity to be increased in accordance with FIG. 3A. As further molecular alignment occurs, molecular movement is hindered. Because the positively charged hydrogen atoms of said aligned molecules are attracted in a direction opposite to the negatively charged oxygen atoms, a polar charge alignment or distribution occurs within the molecules between said voltage zones, as shown in FIG. 3B. And as the energy level of the atoms subjected to resonant pulsing increases, the stationary water molecules become elongated as shown in FIG. 3C. Electrically charged nuclei and electrons are attracted toward opposite electrically charged voltage zones—disrupting the mass equilibium of the water molecule.

In the first stage, as the water molecule is further exposed to a potential difference, the electrical force of attraction of the atoms within the molecule to the electrodes of the chamber also increases in intensity. As a result, the covalent bonding between said atoms which forms the molecule is weakened and ultimately terminated. The negatively charged electron is attracted toward the positively charged hydrogen atoms, while at the same time, the negatively charged oxygen atoms repel electrons.

Once the applied resonant energy caused by pulsation of the electrical field in the cavities reaches a threshold level, the disassociated water molecules, now in the form of liberated hydrogen, oxygen, and ambient air gases begin to ionize and lose or gain electrons during the final stage in the injector assembly. Atom destablization occurs and the electrical and mass equilibrium of the atoms is disrupted. Again, the positive field produced within the chamber or cavity that encompasses the gas stream attracts negatively charged ions while the positively charged ions (and/or hydrogen nuclei) are attracted to the negative field. Atom stabilization does not occur because the pulsating voltage applied is repetitive without polarity change. A potential of approximately several thousand volts triggers the ionization state.

As the ionized particles accumulate within said chamber, the electrical charging effect is again an incremental stepping effect that produces an accumlative increased potential while, at the same time, resonance occurs. The components of the atom begin to "vibrate" at a resonant frequency such that an atomic instability is created. As shown in FIG. 3D, a high energy level is achieved, which then collapses resulting in the release of thermal explosive energy. Particle impact occurs when liberated ions in a gas are subjected to further voltage. A longitudinal cross section of a gas resonant cavity is shown in FIG. 2A. To promote gas ionization, electromagnetic wave energy such as a laser or photon energy source of a predetermined wave length and pulse-intensity is directed to and absorbed by the ions forming said gas. In the device of FIG. 2A, semiconductor optical lasers 20a–20p, 20xxx surround the gas flow path. In the device of FIG. 2B, photon energy 20 is injected into a separate absorption chamber 21. The incremental stimulation of nuclei to a more highly energized state by electromagnetic wave energy causes electron deflection to a higher orbital state. The Pulse rate as well as intensity of the electromagnetic wave source is varied to match the absorption rate of ionized particles to produce the stepped incremental increase in energy. A single laser coupled by means of fiber optic light guides is an alternative to the plurality of lasers shown in FIG. 2B. Continued exposure of the gas ions to different forms of wave energy during voltage stimulation maintains individual atoms in a destabilized state and prevents atomic stabilization.

The highly energized gas ions are thermally ignited when said combustible gas ions pass from injector 4 and enter into and pass through a nozzle, 10 in FIG. 2B, or an optical thermal lens assembly such as shown in FIG. 2C. In FIG. 2C, the combustible gas ions are expelled through and beyond a quenching circuit, 30, and reflected by lenses, 31 and 32, back and forth through a thermal heat zone, 33, prior to atomic breakdown beyond exiting through a final port, 34. A quenching circuit is a restricted orifice through which the particle stream passes such that flashback does not occur. (See my application Ser. No. 835, 564, supra.) The deflection shield or lens, 31, superheats beyond 3,000° F. and the combustible gas ions passing through said exiting-ports are regulated to allow a gas pressure to form inside said thermal zone. The energy yield is controlled by varying the applied voltage, or Pulse-train since said thermallens assembly is self-adjusting to the flow-rate of said ionized and primed gases. The combustible ionic gas mixture is composed of hydrogen, oxygen, and ambient air gases. The hydrogen gas provides the thermal explosive force, the oxygen atoms aid the gas thermal ignition, and the ambient air gases retard the gas thermal ignition process to a controllable state. As the combustible gas mixture is exposed to a voltage pulse train, the stepped increasing voltage potential causes said moving gas atoms to become ionized (losing or gaining electrons) and changes the electrical and mass equilibrium of said atoms. Gases that do not undergo the gas ionization process may accept the liberated electrons (electron entrapment) when exposed to light or photon stimulation. The electron extractor grid circuit, FIGS. 5A and 5B, is applied to the assembly of FIG. 2A or FIG. 2B, and restricts electron replacement. The extractor grid, 56, is applied adjacent to electric field producing members, 44 and 45, within the resonant cavity. The gas ions incrementally reach a critical-state which occurs after a high energy resonant state. At this point the atoms no longer tolerate the missing electrons, the unbalanced electrical field, and the energy stored in the nucleus. Immediate collapse of the system occurs and energy is released as the atoms decay into thermal explosive energy.

The repetitive application of a voltage pulse train (A through J of FIG. 3A) incrementally achieves the critical state of said gas ions. As the gas atoms or ions (la xxx ln) shown in FIG. 3C become elongated during electron removal, electromagnetic wave energy of a predetermined frequency and intensity is injected. The wave energy absorbed by the stimulated gas nuclei and electrons causes further destabilization of the ionic gas. The absorbed energy from all sources causes the gas nuclei to increase in energy state, and induces the ejection of electrons from the nuclei.

To further stimulate the electron entrapment process beyond the atomic level (capturing the liberated electrons during the hydrogen fracturing process) the electron extractor grid (as shown in FIG. 5A) is placed in spaced relationship to the gas resonant cavity structure shown in FIG. 2A. The electron extractor grid is attached to an electrical circuit (such as shown in FIG. 5B) that allows electrons to flow to an electrical load, 55, when a positive electrical potential is placed on the opposite side of said electrical load. The electrical load may be a typical power consuming device such as a light bulb or resistive heat producing device. As the positive electrical potential is switched on or pulse-applied, the negative charged electrons liberated in the gas resonant cavity are drawn away and enter into resistive load where they are consumed and released as heat or light energy. The consuming electrical circuit can be directly connected to the gas resonant cavity positive electrical voltage zone. The incoming positive wave form applied to resonant cavity voltage zone through a blocking diode is synchronized with the pulse train applied to the gas resonant cavity by the circuit of FIG. 4 via alternate gate circuit. As one pulse train is gated "ON," the other pulse train is switched "OFF." A blocking diode directs the electron flow to said electrical load while resistive wire prevents voltage leakage during pulse train "ON" time.

The electron extraction process is maintained during gas flow-rate change by varying the trigger pulse rate in relationship to applied voltage. The electron extraction process also prevents spark-ignition of the combustible gases traveling through the gas resonant cavity because electron build-up and potential sparking is prevented.

In an optical thermal lens assembly or thrust-nozzle, such as shown in FIG. 2C, destablized gas ions (electrically and mass unbalanced gas atoms having highly energized nuclei) can be pressurized during spark-ignition. During thermal interaction, the highly energized and unstable hydrogen gas nuclei collide with the highly energized and unstable oxygen gas nuclei and produce thermal explosive energy beyond the gas burning stage. Other ambient air gases and ions not otherwise consumed limit the thermal explosive process.

Variations of the process and apparatus may be evident to those skilled in the art.

What is claimed is:

1. A method of obtaining the release of energy from a gas mixture including hydrogen and oxygen consisting of:
    (A) providing a first gas mixture including at least a portion of hydrogen and oxygen gases;
    (B) subjecting the gas mixture to a pulsating, polar electric field whereby electrons of the gas atoms are distended in their orbital fields by reason of their subjection to electrical polar forces, at a frequency such that the pulsating electric field induces a resonance with respect to an electron of the gas atom;
    (C) cascading said gas atoms with respect to the pulsating electric field such that the energy level of the resonant electron is increased in cascading incremental steps;
    (D) ionizing said gas atoms;
    (E) subjecting the ionized gas atoms to electromagnetic wave energy having a predetermined frequency to induce a further election resonance in the ion, whereby the energy level of the electron is successively increased;
    (F) extracting further electrons from the resonating ions while such ions are in an increased energy state to destabilize the nuclear and electron configuration of said ions; and
    (G) subjecting the destabilized ions to thermal ignition.

2. An apparatus for obtaining the release of energy from a gas mixture including hydrogen and oxygen consisting of successively interconnected:
    (A) first means for providing a first gas mixture including at least a portion of hydrogen and oxygen gas;
    (B) second means for providing a pulsating, polar electric field to the gas mixture, whereby electrons of the gas atoms are distended in their orbital fields by reason of their subjection to electrical polar forces, at a frequency such that the pulsating electric field induces a resonance with respect to an electron of the gas atom; and the energy level of the resonant electron is increased in cascading, incremental steps;
    (C) third means for providing a further electric field to ionize said gas atoms;
    (D) an electromagnetic wave energy source for subjecting the ionized gas atoms to wave energy of a predetermined frequency to induce a further election resonance in the ion, whereby the energy level of the electron is further successively increased;
    (E) an electron sink for extracting electrons from the resonating ions while such ions are in an increased energy state to destabilize the nuclear and electron configuration of said ions;
    (F) fourth means for directing particle flow in a continuous manner through the electric fields, wave energy source and electron sink to a final orifice at which the destabilized ions are thermally ignited; and
    (G) a final orifice at which the mixture initially provided by the first means, after having passed through and been processed by the preceeding means of the apparatus, is thermally ignited.

* * * * *